United States Patent
Mittal et al.

(10) Patent No.: US 11,093,394 B1
(45) Date of Patent: Aug. 17, 2021

(54) DELEGATED SNOOP PROTOCOL

(71) Applicant: XILINX, INC., San Jose, CA (US)

(72) Inventors: Millind Mittal, Saratoga, CA (US); Jaideep Dastidar, San Jose, CA (US)

(73) Assignee: XILINX, INC., San Jose, CA (US)

( * ) Notice: Subject to any disclaimer, the term of this patent is extended or adjusted under 35 U.S.C. 154(b) by 92 days.

(21) Appl. No.: 16/560,435

(22) Filed: Sep. 4, 2019

(51) Int. Cl.
*G06F 12/0815* (2016.01)

(52) U.S. Cl.
CPC .. *G06F 12/0815* (2013.01); *G06F 2212/1016* (2013.01); *G06F 2212/271* (2013.01)

(58) Field of Classification Search
CPC ......... G06F 12/0815; G06F 2212/1016; G06F 2212/271
See application file for complete search history.

(56) References Cited

U.S. PATENT DOCUMENTS

| | | |
|---|---|---|
| 6,608,813 B1 | 8/2003 | Chiussi et al. |
| 6,914,907 B1 | 7/2005 | Bhardwaj et al. |
| 8,422,493 B2 | 4/2013 | Kono et al. |
| 8,787,374 B2 | 7/2014 | Maeda et al. |
| 9,306,845 B2 | 4/2016 | Kumagai et al. |
| 9,391,835 B2 | 7/2016 | Aoshima et al. |
| 9,525,591 B2 | 12/2016 | Yasuda et al. |
| 9,794,194 B2 | 10/2017 | Yasuda et al. |
| 10,097,466 B2 | 10/2018 | Tang et al. |
| 2018/0287964 A1 | 10/2018 | Gray |
| 2020/0394141 A1* | 12/2020 | Ramagiri ............ G06F 12/0864 |

OTHER PUBLICATIONS

U.S. Appl. No. 15/967,473, filed Apr. 30, 2018, Entitled: "Circuit for and Method of Providing a Programmable Connector of an Integrated Circuit Device".
U.S. Appl. No. 16/024,500, filed Jun. 29, 2018, Entitled: "Transparent Port Aggregation in Multi-Chip Transport Protocols".
U.S. Appl. No. 16/025,762, filed Jul. 2, 2018, Entitled: "Logical Transport Overlayed Over a Physical Transport Having a Tree Topology".
U.S. Appl. No. 16/053,384, filed Aug. 2, 2018, Entitled: "Logical Transport Over a Fixed PCIE Physical Transport Network".
U.S. Appl. No. 16/141,704, filed Sep. 25, 2018, Entitled: "Scalable Coherence Management Independent of Transport Protocol".
U.S. Appl. No. 16/053,488, filed Aug. 2, 2018, Entitled: "Hybrid Precise and Imprecise Cache Snoop Filtering".
U.S. Appl. No. 16/208,260, filed Dec. 3, 2018, Entitled: "Scratchpad Memory Management in a Computing System".

* cited by examiner

*Primary Examiner* — Eric Cardwell
(74) *Attorney, Agent, or Firm* — Patterson + Sheridan, LLP (57) ABSTRACT

An example Cache-Coherent Non-Uniform Memory Access (CC-NUMA) system includes: one or more fabric switches; a home agent coupled to the one or more fabric switches; first and second response agents coupled to the fabric switches; wherein the home agent is configured to send a delegated snoop message to the first response agent, the delegated snoop message instructing the first response agent to snoop the second response agent; wherein the first response agent is configured to snoop the second response agent in response to the delegated snoop message; and wherein the first and second response agents are configured to perform a cache-to-cache transfer during the snoop.

20 Claims, 8 Drawing Sheets

DELEGATED SNOOP PROTOCOL

TECHNICAL FIELD

Examples of the present disclosure generally relate to computing systems and, in particular, to a delegated snoop protocol in a computing system.

BACKGROUND

Multi-socket server systems, as well as cache-coherent central processor unit (CPU)-accelerator systems, are all inherently Cache-Coherent Non-Uniform Memory. Access (CC-NUMA) systems. Examples include those enabled by CCIX, QPI/UPI, AMD Infinity Fabric, NVLink, and Open-CAPI technologies. The non-uniformity of memory access comes about as a result of the difference in both latency and bandwidth depending on whether the Request Agent (e.g., CPU or Accelerator) accesses same-socket/same-accelerator local memory or different-socket/different-accelerator remote memory. Overall system performance improves such that the increase in scale of both compute and memory achieved by the CC-NUMA system can offset any impact created by the non-uniformity of memory access.

Current methods mitigate the non-uniformity inherent in CC-NUMA systems with the CPUs, accelerators, and the sockets in which the CPUs and/or accelerators have large private, shared, remote, or last level caches. Current techniques may further mitigate CC-NUMA by enhancing the cache-coherency protocol to allow direct cache-to-cache transfers between Request and Snooped Agents in the system. Instead of the data being returned from the Snooped Agent to the Home Agent and then back to the Request Agent, the data is transferred directly from the Snooped Agent to the Request Agent.

However, even if direct cache-to-cache transfers occur between Request Agents (RAs) and Snooped Agents (SAs), Home Agents (HAs) continue to service all coherency actions between HA and SA and HA and RA, including additional protocol messaging in service of cache-to-cache transfer. Accordingly, it is desirable to reduce the amount of protocol messaging and improve performance of a CC-NUMA system.

SUMMARY

Techniques for providing a delegated snoop protocol in a Cache-Coherent Non-Uniform Memory Access (CC-NUMA) system. The CC-NUMA includes: one or more fabric switches; a home agent coupled to the one or more fabric switches; first and second response agents coupled to the fabric switches; wherein the home agent is configured to send a delegated snoop message to the first response agent, the delegated snoop message instructing the first response agent to snoop the second response agent; wherein the first response agent is configured to snoop the second response agent in response to the delegated snoop message; and wherein the first and second response agents are configured to perform a cache-to-cache transfer during the snoop.

In another example, a method of communication in a Cache-Coherent Non-Uniform Memory Access (CC-NUMA) system, the CC-NUMA system including a home agent coupled to a coherent communication network, and first and second response agents coupled to the coherent communication network, is described. The method includes: sending, from the home agent to the first response agent, a delegated snoop message, the delegated snoop message instructing the first response agent to snoop the second response agent; snooping, by the first response agent, the second response agent in response to the delegated snoop message; and performing a cache-to-cache transfer between the first and second response agents during the snoop.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Figure 1A:
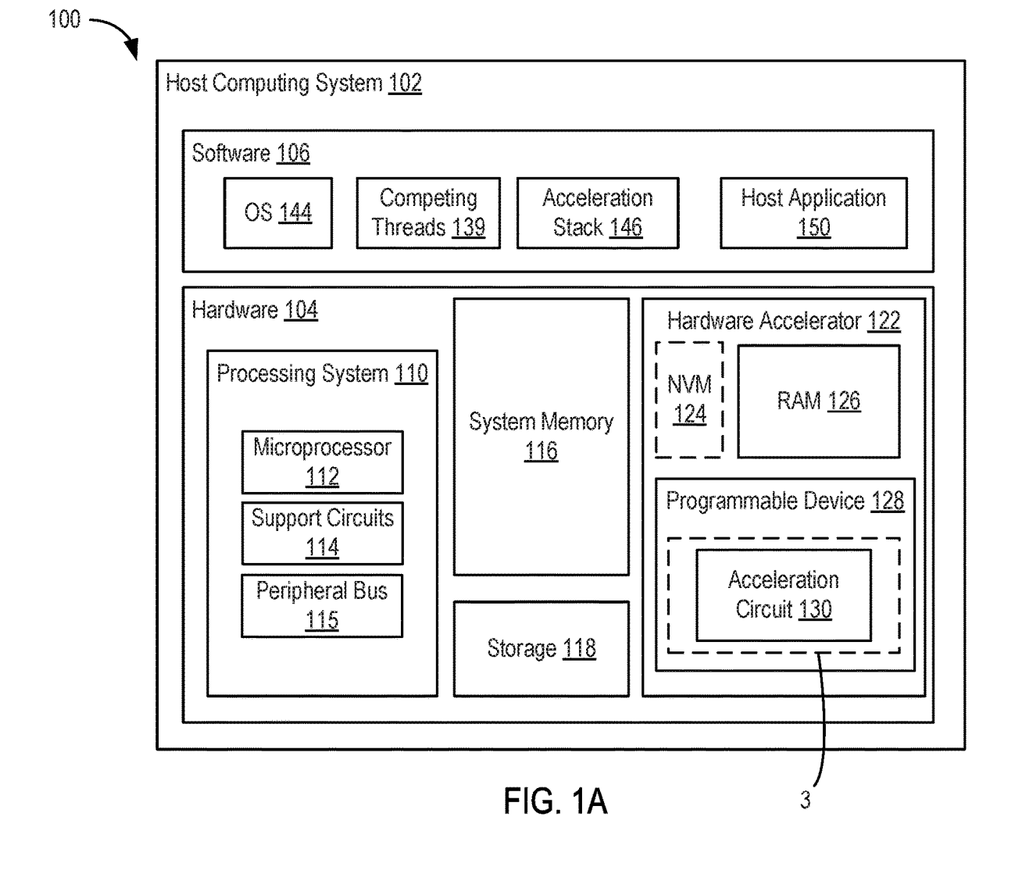
FIG. 1A is a block diagram depicting a hardware acceleration system according to an example.

FIG. 1A is a block diagram depicting a hardware acceleration system 100 according to an example. The hardware acceleration system 100 includes a host computing system 102. The host computing system 102 includes a hardware platform ("hardware 104") and a software platform ("software 106") executing on the hardware 104. The hardware 104 includes a processing system 110, system memory 116, storage devices ("storage 118"), and a hardware accelerator 122. The software 106 includes an operating system (OS) 144, an acceleration stack 146, a host application 150, and competing threads 139.

The processing system 110 includes a microprocessor 112, support circuits 114, and a peripheral bus 115. The microprocessor 112 can be any type of general-purpose central processing unit (CPU), such as an x86-based processor, ARM®-based processor, or the like. The microprocessor 112 can include one or more cores and associated circuitry (e.g., cache memories, memory management units (MMUs), interrupt controllers, etc.). The microprocessor 112 is configured to execute program code that perform one or more operations described herein and which can be stored in the system memory 116 and/or the storage 118. The support circuits 114 include various devices that cooperate with the microprocessor 112 to manage data flow between the microprocessor 112, the system memory 116, the storage 118, the hardware accelerator 122, or any other peripheral device. For example, the support circuits 114 can include a chipset (e.g., a north bridge, south bridge, platform host controller, etc.), voltage regulators, firmware (e.g., a basic input-output system (BIOS)), and the like. The support circuits 114 manage data flow between the microprocessor 112 and the peripheral bus 115, to which various peripherals, such as the hardware accelerator 122, are connected. In some examples, the microprocessor 112 can be a System-in-Package (SiP), System-on-Chip (SOC), or the like, which absorbs all or a substantial portion of the functionality of the chipset (e.g., north bridge, south bridge, etc.). The peripheral bus 115 can implement an expansion bus standard, such as Peripheral Component Interconnect Express (PCIe) or the like.

The system memory 116 is a device allowing information, such as executable instructions and data, to be stored and retrieved. The system memory 116 can include, for example, one or more random access memory (RAM) modules, such as double-data rate (DDR) dynamic RAM (DRAM). The storage 118 includes local storage devices (e.g., one or more hard disks, flash memory modules, solid state disks, and optical disks) and/or a storage interface that enables the computing system 102 to communicate with one or more network data storage systems. The hardware 104 can include various other conventional devices and peripherals of a computing system, such as graphics cards, universal serial bus (USB) interfaces, and the like.

In an example, the hardware accelerator 122 includes a programmable device 128 and RAM 126. The hardware accelerator 122 can optionally include a non-volatile memory (NVM) 124. The programmable device 128 can be a field programmable gate array (FPGA) or an SOC having FPGA programmable logic along with other embedded subsystems. The NVM 124 can include any type of non-volatile memory, such as flash memory or the like. The RAM 126 can include DDR DRAM or the like. The RAM 126 can be organized into discrete RAM banks 127, as described further below. The programmable device 128 is coupled to the NVM 124 and the RAM 126. The programmable device 128 is also coupled to the peripheral bus 115 of the processing system 110.

The OS 144 can be any commodity operating system known in the art, such as such as Linux®, Microsoft Windows®, Mac OS®, or the like. The acceleration stack 146 includes drivers and libraries that provide application programming interfaces (APIs) to the hardware accelerator 122 for command and control thereof.

Figure 1B:
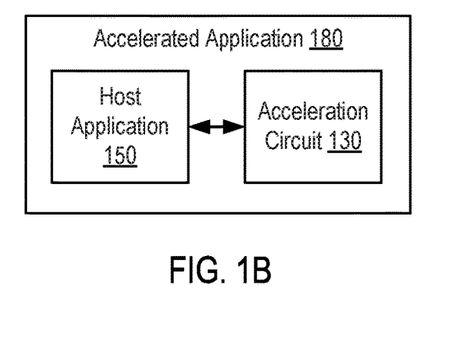
FIG. 1B is a block diagram depicting an accelerated application according to an example.

FIG. 1B is a block diagram depicting an accelerated application 180 according to an example. The accelerated application 180 includes the host application 150 and an acceleration circuit 130. The acceleration circuit 130 is programmed in programmable logic (PL) 3 of the programmable device 128 on the hardware accelerator 122. The host application 150 includes software executing on the microprocessor 112 that invokes the acceleration circuit 130 using API calls to the acceleration stack 146 to perform some work. The host application 150 can include neural network, video processing, network processing, or the like type applications that offload some functions to the hardware accelerator 122.

In the example, the processing system 110 is shown separate from the hardware accelerator 122. In other examples discussed further below, the processing system 110 and the hardware accelerator 122 can be implemented within the same programmable device (e.g., a programmable device with an embedded processing system). In such case, the processing system 110 can utilize alternative interconnects with the PL 3 for communicating with the acceleration circuit 130, examples of which are described below. Further, in the examples discussed herein, the acceleration circuit 130 is implemented in a programmable device 128. In other examples, the programmable device 128 can be replaced by any integrated circuit (IC), including an application specific integrated circuit (ASIC) in which the acceleration circuit 130 comprises hardened circuitry formed therein. Thus, the lock circuit 140 and mutual exclusion scheme discussed herein applies to acceleration circuits in both programmable devices and ASICs.

Figure 2:
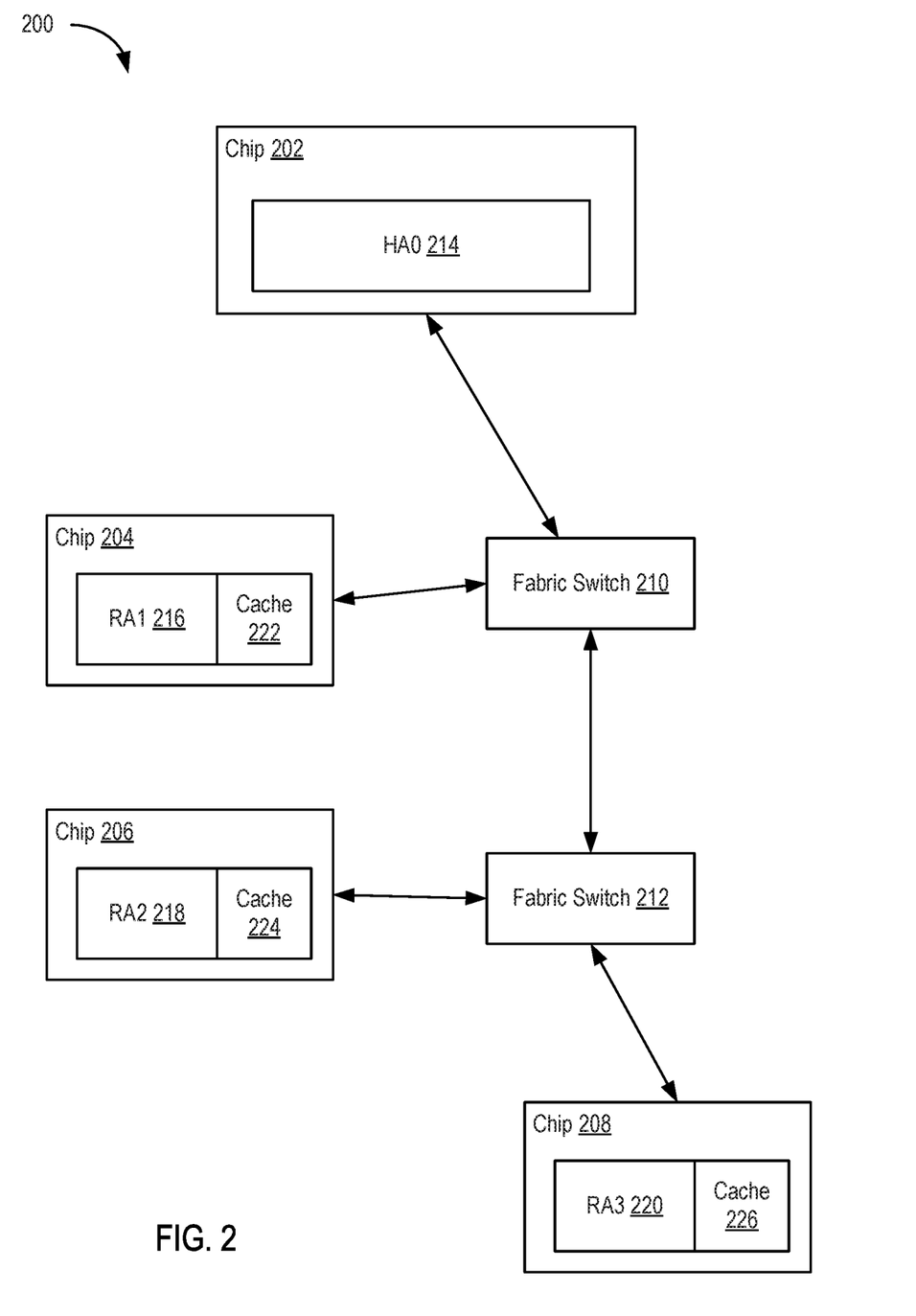
FIG. 2 is a block diagram depicting a CC-NUMA system according to an example.

FIG. 2 is a block diagram depicting a CC-NUMA system 200 according to an example. The CC-NUMA system 200 includes a coherent communication network having a plurality of chips, e.g., chips 202, 204, 206, and 208. The chip 202 includes a home agent 0 (HA0) 214. The chip 204 includes a request agent 1 (RA1) 216; the chip 306 includes an RA2 218; and the chip 208 includes an RA3 220. In various examples, the request agents are referred to herein as RA1, RA2, or RA3 or more generally by their reference characters 216, 218, and 220. The chip 204 includes a cache memory ("cache 222"); the chip 306 includes a cache 224; and the chip 208 includes a cache 226. The CC-NUMA system 200 also includes fabric switches 210 and 212. In an example, the fabric switch 210 can be integrated with the chip 204. In another example, the fabric switch 212 can be integrated with the chip 206. The techniques described herein are not affected by the location of the fabric switches, whether they are separate components or integrated within another component of the system. Further, the techniques described herein do not rely only on fabric switches for connections between RAs and HAs. In examples, communication protocol techniques other than fabric switches can be used, e.g., ring or daisy chained topologies.

The CC-NUMA system 200 can be implemented in the system 100 described above. For example, the chip 202 can by the microprocessor 112, and the chips 204, 206 and 208 can be programmable devices 128 of different hardware accelerators 122. The fabric switches 210 and 212 are switches in the peripheral bus 115 (e.g., PCIe switches). Although three RAs and two fabric switches are shown, the system 200 can have more than two fabric switches and more or less than three RAs.

In prior CC-NUMA systems, even if direct cache-to-cache transfers occur between RAs and SAs, HAs continue to service all coherency actions between HA and SA and between HA and RA, including additional protocol messaging in service of the cache-to-cache transfer. Example protocol messages involving the HA include:

0. RA to HA request that triggers the subsequent actions
1. HA to SA request messaging
2. SA to HA response messaging with confirmation of its ability to send the direct cache-to-cache transfer.
3. SA to HA response messaging informing the HA of the SA's cache state subsequent to the direct cache-to-cache transfer.
4. RA to HA response messaging with the confirmation of its receipt of the direct cache-to-cache transfer.
5. RA to HA response messaging informing the HA of the RA's cache state subsequent to the direct cache-to-cache transfer.

Furthermore:

6. Current methods of direct cache-to-cache transfer require additional resources and communication protocol on the new SA to RA direct cache-to-cache transfer datapath.
7. Current methods of direct cache-to-cache transfer may require HAs to choose between servicing the new requests or acting or reacting to events 1-5 detailed above.

In examples described herein, techniques allow the HA to delegate to the RA: the initial snoop action, subsequent actions related to achieving cache-to-cache transfer from the SA to the RA, and the final actions of servicing the separate snoop responses from both the RA and the SA. As a result of the techniques described herein, HA-SA interactions are offloaded and methods for SA-RA interactions take their place instead. The techniques offer a higher level of concurrency and performance compared to current methods by reducing the five example interactions required of HAs to only two actions required by HAs. That is, 1) the HA delegates the snoop request; and 2) the HA reacts to the final delegated snoop response. The techniques also achieve the advantages of direct cache-to-cache transfers without the overhead of steps 6 and 7 above.

As described herein, the HA delegates the responsibility to the RA of sending the initial snoop and then servicing all subsequent snoop messages. Unlike current methods, the techniques of the system scale not only with the number of outstanding delegated snoops being proportional to the number of outstanding requests, but also being proportional to the number of RAs with requests to the HA(s). To illustrate this point using FIG. 2, if RA1, RA2, and RA3 were each to send 100 requests to HA0, not only would HA0 be servicing 300 initial requests, but current methods would require HA0 to execute steps 1-5, thus resulting in 1500 actions being services by HA0. With the described techniques, however, HA0 executes only two actions per request, resulting in 900 fewer actions being service by HA0. Meanwhile, RA1, RA2, and RA3 can each service 100 delegated snoop actions independently and concurrently with the delegated snoop load independently affecting each RA proportional to that RA's request load.

Figure 3:
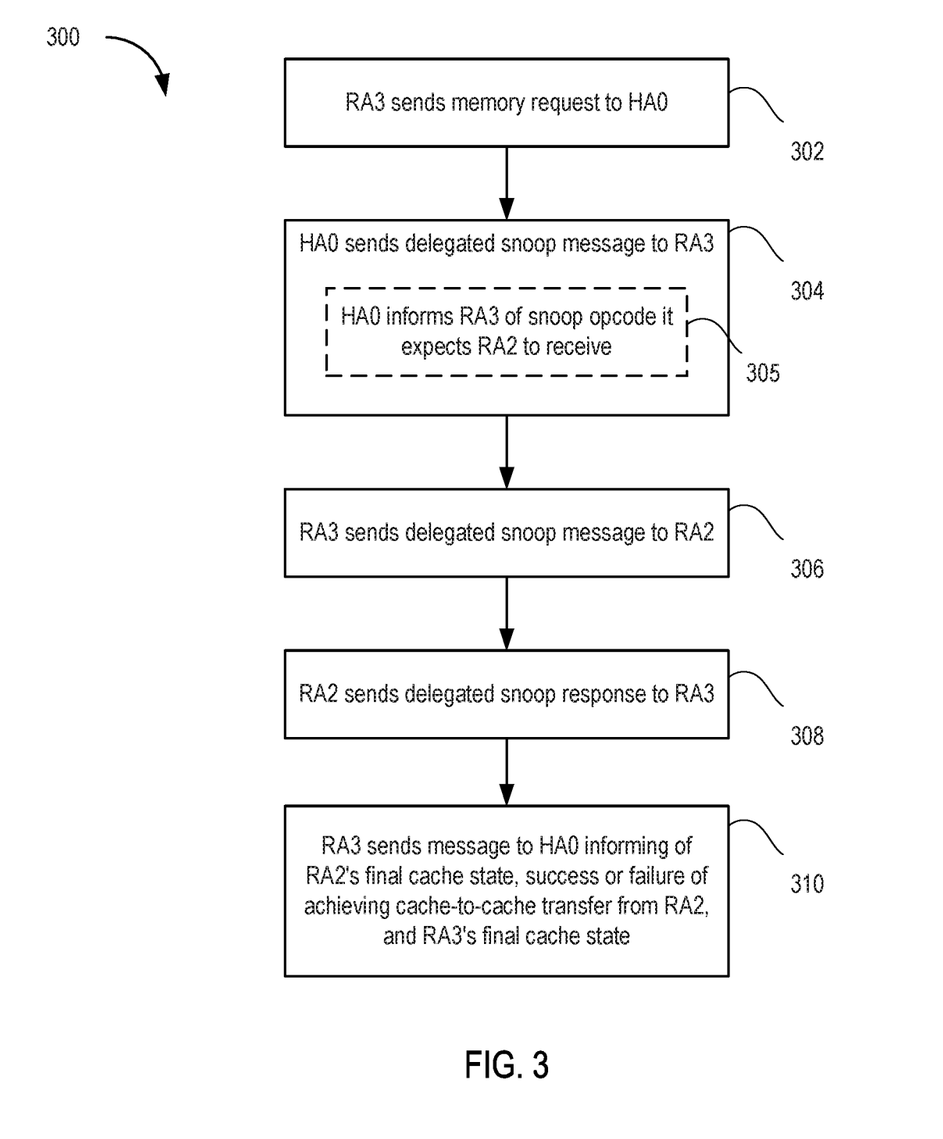
FIG. 3 is a flow diagram depicting a method of a delegated snoop protocol according to an example.

FIG. 3 is a flow diagram depicting a method 300 of a delegated snoop protocol according to an example. The method 300 can be understood with reference to FIG. 2 described above. The method 300 begins at step 302, where RA3 sends a memory request to HA0 that triggers subsequent actions. At step 304, HA0 sends a delegated snoop message to RA3. The delegated snoop message delegates the job of snooping RA2 to RA3.

At step 306, RA3 sends a delegate snoop message to RA2. The delegated snoop message informs RA2 that even though the address is homed by HA0, the response and optionally the data from RA2 are to be returned to RA3. At step 308, RA2 sends a delegated snoop response to RA3. The delegated snoop response includes a confirmation by RA2 of its ability to send the direct cache-to-cache transfer to RA3, and information regarding RA2's final cache state after servicing the delegated snoop. The cache-to-cache transfer data may either be sent along with the delegated snoop response or via a separate delegated data response message. At step 310, RA3 sends a response to HA0. The response includes RA2's final cache state, success or failure of achieving a direct cache-to-cache transfer from RA2, and if successful, RA3's final cache state.

In an example, at step 304, a variation of the technique allows HA0 to also inform RA3 of the snoop opcode it expects RA2 to receive (step 305). Another variation allows HA0 to inform RA3, or RA3 to independently issue a broadcast snoop opcode, if the HA can guarantee that only one snooped RA will have a shared or unique copy of the cached line and respond accordingly. In the example, RA2 has the sole copy. The techniques described above also comprehend a variation where the delegated snoop message (step 304), subsequent to RA3 to RA2 delegated snoops (step 306), subsequent to RA2 to RA3 delegated snoop response (step 308), and final RA3 to HA delegated snoop response, can each comprehend a single message applying to a chain of addresses with an implicit property by which the addresses are chained together, such as sequential cache line address order. Although not shown, the techniques comprehend a step where HA0 supplies the data if step 310 were to indicate to HA0 that RA3 failed to achieve a direct cache-to-cache transfer from RA2.

Figure 4:
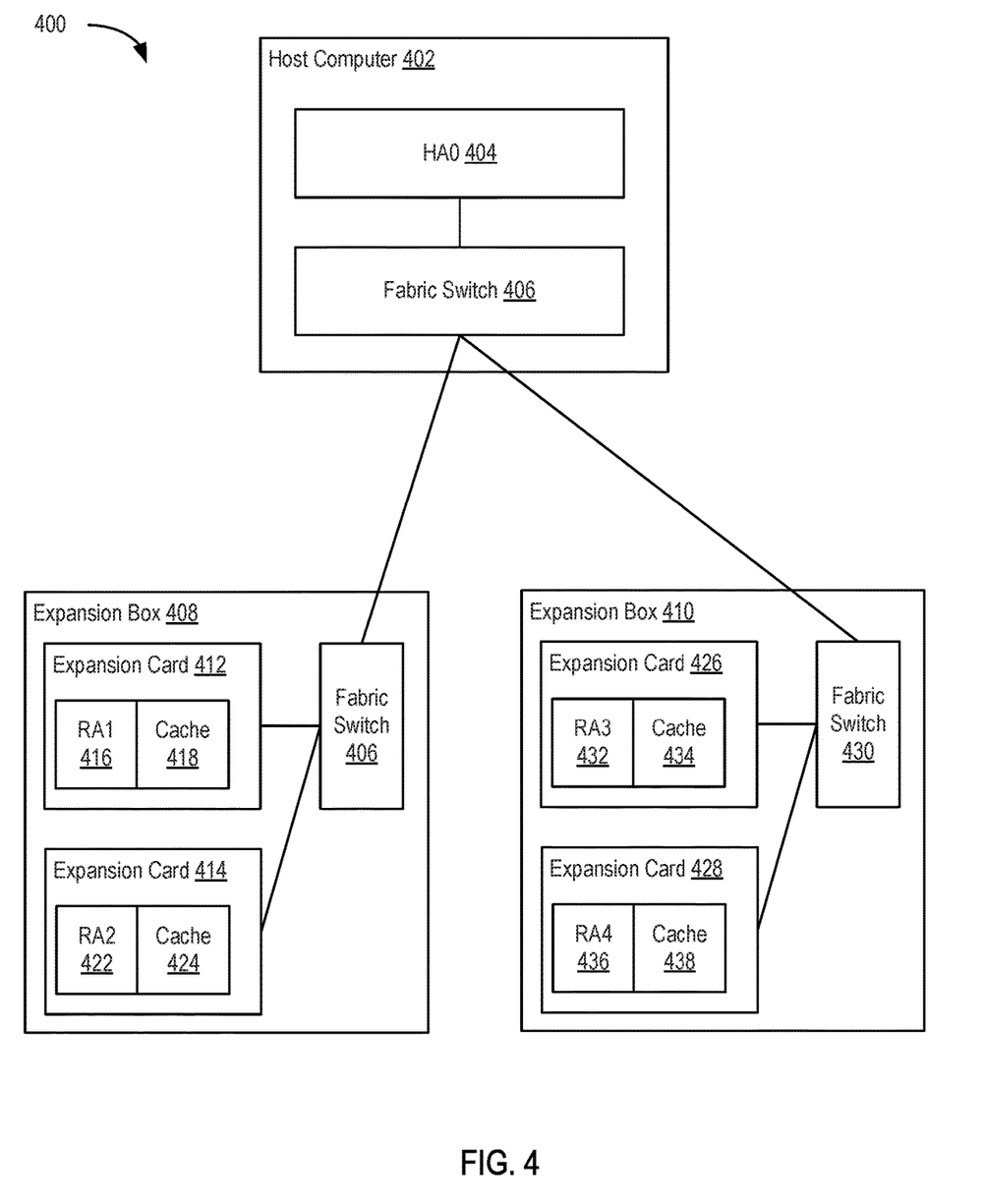
FIG. 4 is a block diagram depicting a CC-NUMA system according to an example.

FIG. 4 is a block diagram depicting a CC-NUMA system 400 according to an example. In this example, the CC-NUMA system 400 includes a coherent communication network having a host computer 402 and expansion boxes 408 and 410. The host computer 402 includes HA0 404 and fabric switch 406. The expansion box 408 includes expansion cards 412 and 414 and a fabric switch 406. The expansion box 410 includes expansion cards 426 and 428 and fabric switch 430. The expansion card 412 includes RA1 416 and cache 418. The expansion card 414 includes RA2 422 and cache 424. The expansion card 426 includes RA3 432 and cache 434. The expansion card 428 includes RA4 436 and cache 438.

The HA0 404 is coupled to the fabric switch 406. For example, the fabric switch 406 can be a PCIe switch or the like. The fabric switch 406 is coupled to the fabric switches 406 and 430. The fabric switch 406 is coupled to the expansion cards 412 and 414. The fabric switch 430 is coupled to the expansion cards 426 and 428.

Until now, the techniques focused on the HA offloading delegated snoops to the RA and the advantages centered on the benefit of the HA servicing fewer actions of the steps shown in FIG. 3. If the CC-NUMA system where such that a collection of RAs had proximity to each other, but a latency overhead in terms of communicating with the HA, then the additional communication steps between the snooped agent and request agent of conventional methods also incurs the latency overhead of communicating with the HA. With the techniques described herein, however, only steps 304 and 310 incur the additional latency overhead. With the topology shown in FIG. 4, delegated snoop messaging between RA1 and RA2 on expansion box 408 and between RA3 and RA4 in expansion box 410 can occur concurrently even though all the accesses are homed on HA0. So while the RAs on expansion boxes 408 and 410 can execute steps 306 and 308 with low latency messaging as well as high-bandwidth cache-to-cache transfers, only the initial delegated snoop request step 304 and the final delegated snoop response 308 incur the high(er) latency transfer back to HA0.

Figure 5A:
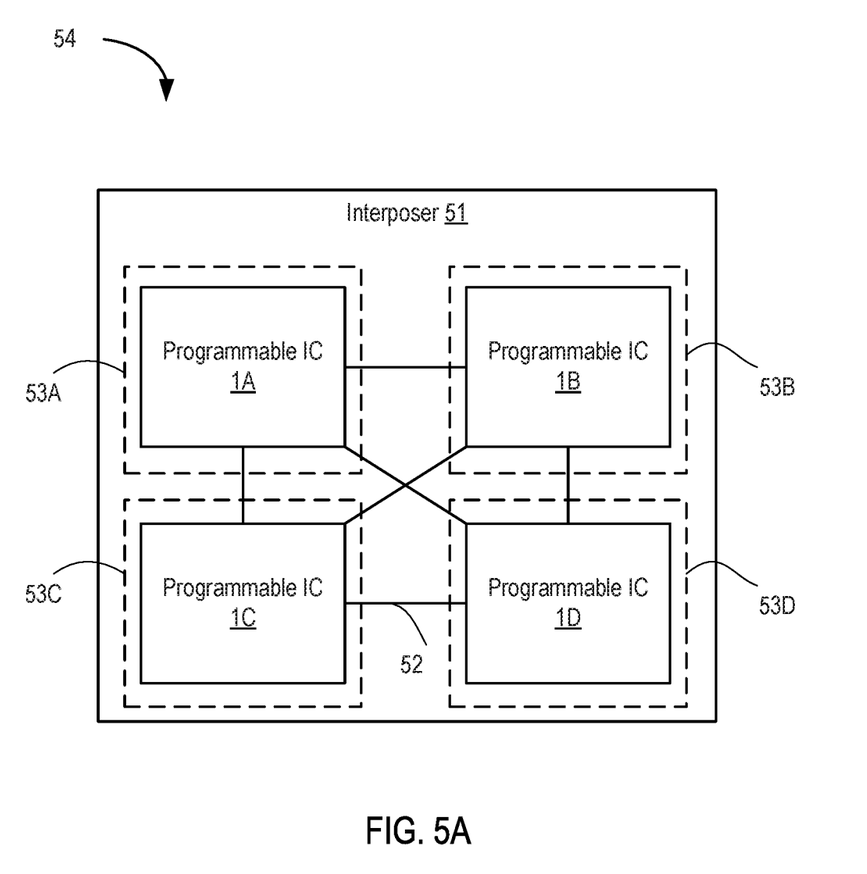
FIG. 5A is a block diagram depicting a multi-integrated circuit (IC) programmable device according to an example.

FIG. 5A is a block diagram depicting a programmable device 54 according to an example. The programmable device 54 can be used to implement the programmable device 128 in the hardware accelerator 122. The programmable device 54 includes a plurality of programmable integrated circuits (ICs) 1, e.g., programmable ICs 1A, 1B, 1C, and 1D. In an example, each programmable IC 1 is an IC die disposed on an interposer 51. Each programmable IC 1 comprises a super logic region (SLR) 53 of the programmable device 54, e.g., SLRs 53A, 53B, 53C, and 53D. The programmable ICs 1 are interconnected through conductors on the interposer 51 (referred to as super long lines (SLLs) 52).

Figure 5B:
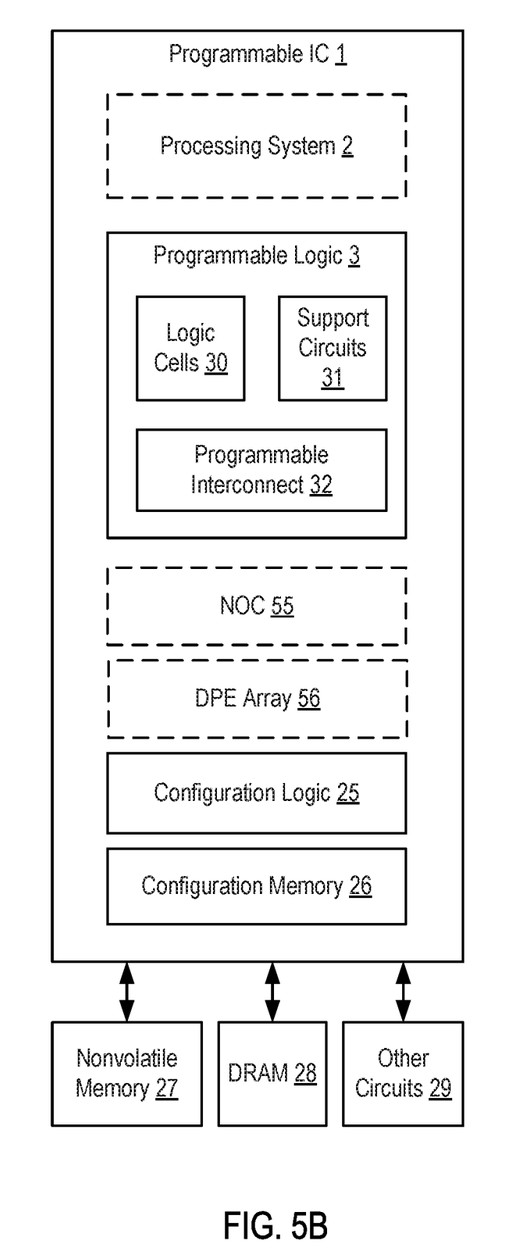
FIG. 5B is a block diagram depicting a programmable IC according to an example.

FIG. 5B is a block diagram depicting a programmable IC 1 according to an example. The programmable IC 1 can be used to implement the programmable device 128 or one of the programmable ICs 5A-5D in the programmable device 54. The programmable IC 1 includes programmable logic 3 (also referred to as a programmable fabric), configuration logic 25, and configuration memory 26. The programmable IC 1 can be coupled to external circuits, such as nonvolatile memory 27, DRAM 28, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 27 or any other source (e.g., the DRAM 28 or from the other circuits 29). In some examples, the programmable IC 1 includes a processing system 2. The processing system 2 can include microprocessor(s), memory, support circuits, IO circuits, and the like. In some examples, the programmable IC 1 includes a network-on-chip (NOC) 55 and data processing engine (DPE) array 56. The NOC 55 is configured to provide for communication between subsystems of the programmable IC 1, such as between the PS 2, the PL 3, and the DPE array 56. The DPE array 56 can include an array of DPE's configured to perform data processing, such as an array of vector processors.

Figure 5C:
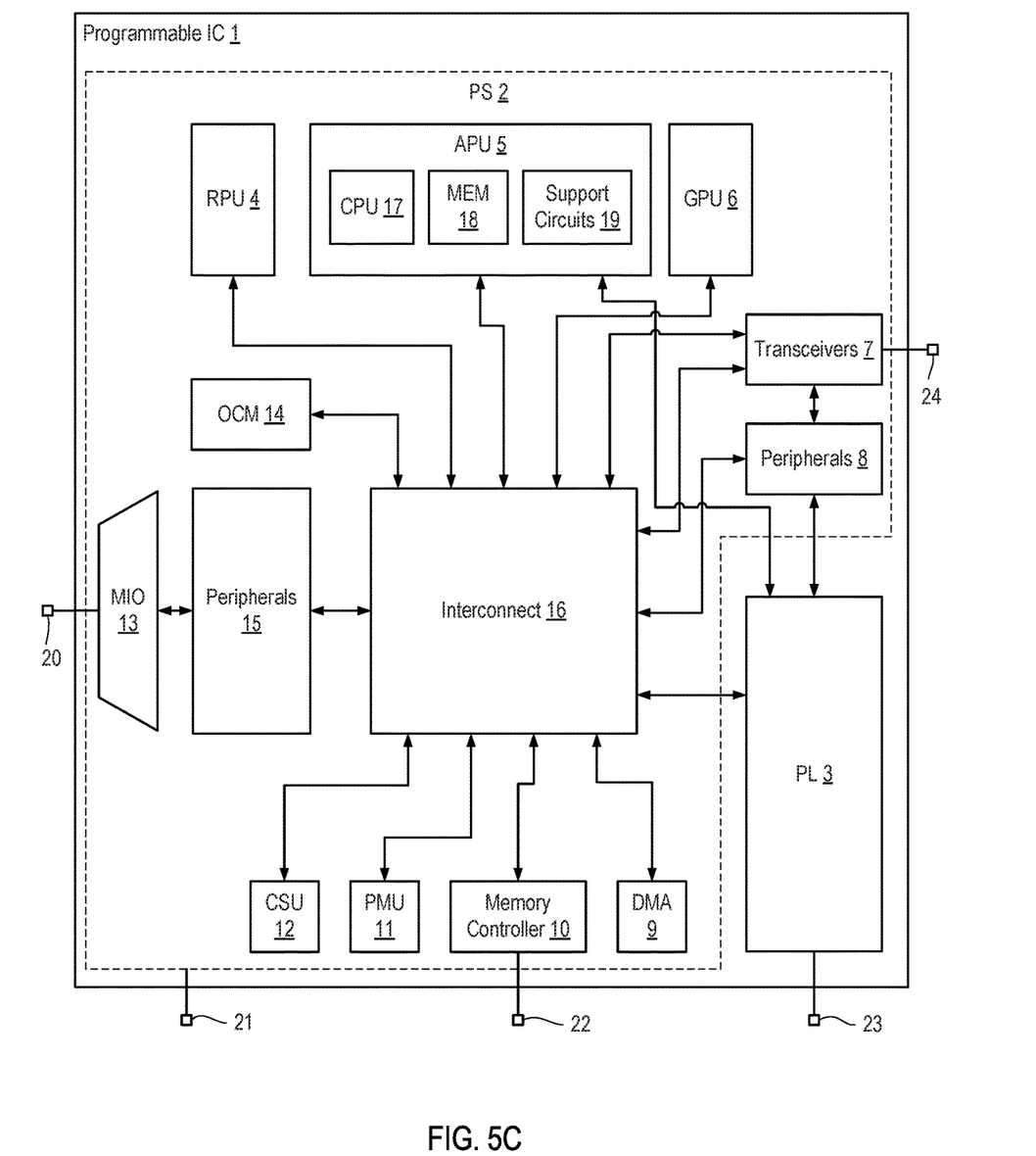
FIG. 5C is a block diagram depicting a System-on-Chip (SOC) implementation of a programmable IC according to an example.

FIG. 5C is a block diagram depicting an SOC implementation of the programmable IC 1 according to an example. In the example, the programmable IC 1 includes the processing system 2 and the programmable logic 3. The processing system 2 includes various processing units, such as a real-time processing unit (RPU) 4, an application processing unit (APU) 5, a graphics processing unit (GPU) 6, a configuration and security unit (CSU) 12, a platform management unit (PMU) 122, and the like. The processing system 2 also includes various support circuits, such as on-chip memory (OCM) 14, transceivers 7, peripherals 8, interconnect 16, DMA circuit 9, memory controller 10, peripherals 15, and multiplexed 10 (MIO) circuit 13. The processing units and the support circuits are interconnected by the interconnect 16. The PL 3 is also coupled to the interconnect 16. The transceivers 7 are coupled to external pins 24. The PL 3 is coupled to external pins 23. The memory controller 10 is coupled to external pins 22. The MIO 13 is coupled to external pins 20. The PS 2 is generally coupled to external pins 21. The APU 5 can include a CPU 17, memory 18, and support circuits 19.

In the example of FIG. 5C, the programmable IC 1 can be used in the hardware accelerator 122 and can function as described above. The acceleration circuit 130 can be programmed in the PL 3 and function as described above. In another example, the functionality of the hardware 104 described above can be implemented using the PS 2, rather than through hardware of a computing system. In such case, the software 106 executes on the PS 2 and functions as described above.

Referring to the PS 2, each of the processing units includes one or more central processing units (CPUs) and associated circuits, such as memories, interrupt controllers, direct memory access (DMA) controllers, memory management units (MMUs), floating point units (FPUs), and the like. The interconnect 16 includes various switches, busses, communication links, and the like configured to interconnect the processing units, as well as interconnect the other components in the PS 2 to the processing units.

The OCM 14 includes one or more RAM modules, which can be distributed throughout the PS 2. For example, the OCM 14 can include battery backed RAM (BBRAM), tightly coupled memory (TCM), and the like. The memory controller 10 can include a DRAM interface for accessing external DRAM. The peripherals 8, 15 can include one or more components that provide an interface to the PS 2. For example, the peripherals 15 can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose 10 (GPIO) ports, serial advanced technology attachment (SATA) ports, PCIe ports, and the like. The peripherals 15 can be coupled to the MIO 13. The peripherals 8 can be coupled to the transceivers 7. The transceivers 7 can include serializer/deserializer (SERDES) circuits, multi-gigabit transceivers (MGTs), and the like.

Figure 5D:
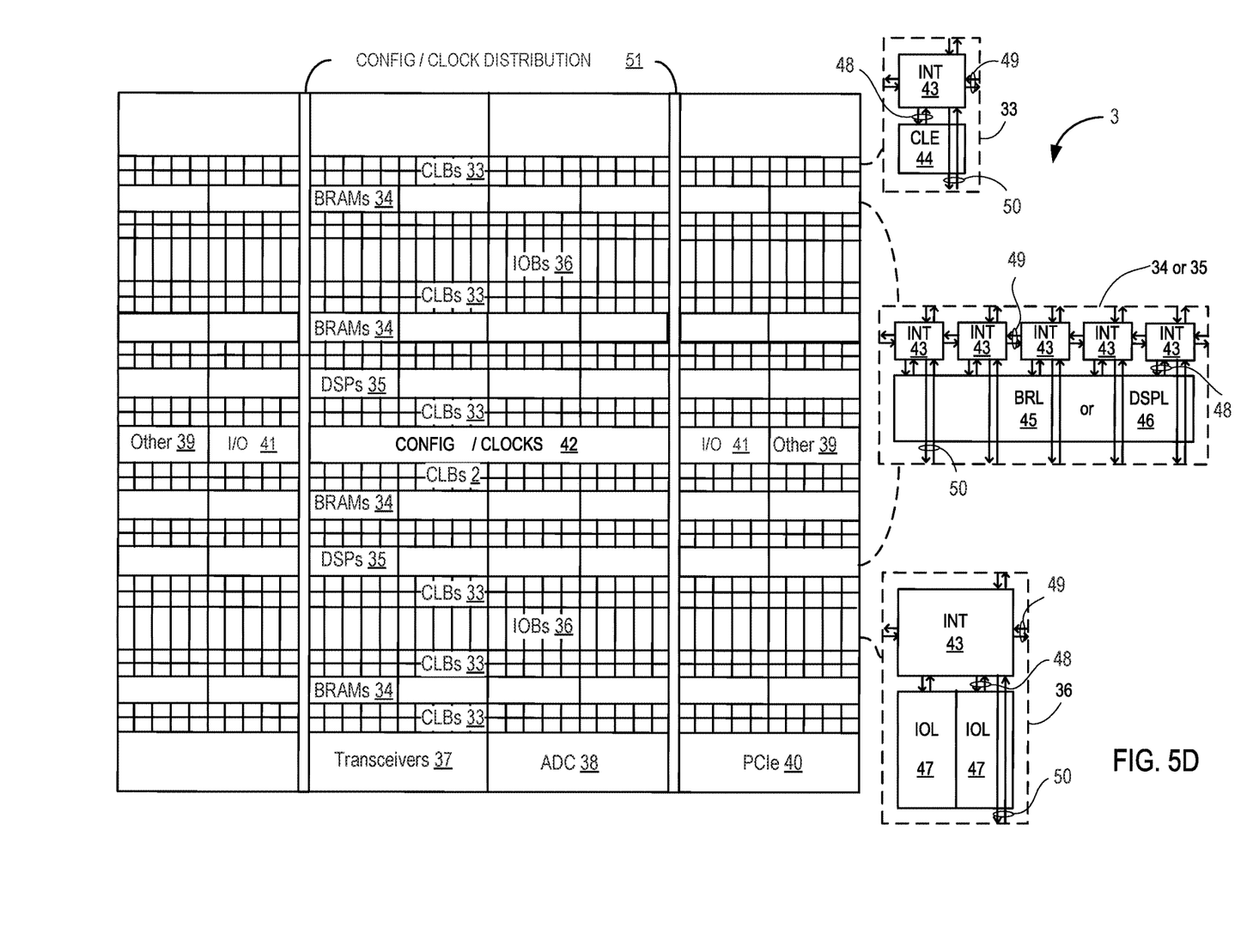
FIG. 5D illustrates a field programmable gate array (FPGA) implementation of a programmable IC according to an example.

FIG. 5D illustrates a field programmable gate array (FPGA) implementation of the programmable IC 1 that includes the PL 3. The PL 3 shown in FIG. 5D can be used in any example of the programmable devices described herein. The PL 3 includes a large number of different programmable tiles including transceivers 37, configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital clock managers, analog-to-digital converters, system monitoring logic, and so forth. The PL 3 can also include PCIe interfaces 40, analog-to-digital converters (ADC) 38, and the like.

In some PLs, each programmable tile can include at least one programmable interconnect element ("INT") 43 having connections to input and output terminals 48 of a programmable logic element within the same tile, as shown by examples included at the top of FIG. 5D. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated PL.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 5D) is used for configuration, clock, and other control logic. Vertical columns 51 extending from this horizontal area or column are used to distribute the clocks and configuration signals across the breadth of the PL.

Some PLs utilizing the architecture illustrated in FIG. 5D include additional logic blocks that disrupt the regular columnar structure making up a large part of the PL. The additional logic blocks can be programmable blocks and/or dedicated logic. Note that FIG. 5D is intended to illustrate only an exemplary PL architecture. For example, the numbers of logic blocks in a row, the relative width of the rows, the number and order of rows, the types of logic blocks included in the rows, the relative sizes of the logic blocks, and the interconnect/logic implementations included at the top of FIG. 5D are purely exemplary. For example, in an actual PL more than one adjacent row of CLBs is typically included wherever the CLBs appear, to facilitate the efficient implementation of user logic, but the number of adjacent CLB rows varies with the overall size of the PL.

While the foregoing is directed to specific examples, other and further examples may be devised without departing from the basic scope thereof, and the scope thereof is determined by the claims that follow.

What is claimed is:

1. A Cache-Coherent Non-Uniform Memory Access (CC-NUMA) system, comprising:
    a home agent coupled to a coherent communication network; and
    first and second response agents coupled to the coherent communication network,
    wherein the home agent is configured to send a first delegated snoop message to the first response agent based on a memory request received from the first response agent, the first delegated snoop message instructing the first response agent to snoop the second response agent;
    wherein the first response agent is configured to send a second delegated snoop message to the second response agent bypassing the home agent and based on the first delegated snoop message; and
    wherein the first and second response agents are configured to perform a direct cache-to-cache transfer based on the second delegated snoop message.

2. The CC-NUMA system of claim 1, wherein the first response agent is configured to inform the second response agent that even though an address is homed by the home agent, a response from the second response agent is to be sent to the first response agent.

3. The CC-NUMA system of claim 2, wherein the first response agent is further configured to inform the second response agent that data from the second response agent is to be sent to the first response agent.

4. The CC-NUMA system of claim 1, wherein the second response agent is configured to send a delegated snoop response to the first response agent, the delegated snoop response configured to confirm that the second response agent can send the direct cache-to-cache transfer to the first response agent.

5. The CC-NUMA system of claim 4, wherein the delegated snoop response is configured to provide information related to a cache state of the second response agent after the second delegated snoop message is received by the second response agent.

6. The CC-NUMA system of claim 1, wherein the first response agent is configured to send a response to the home agent, the response indicates a cache state of the second response agent.

7. The CC-NUMA system of claim 6, where in the response indicates success or failure of achieving the direct cache-to-cache transfer between the first response agent and the second response agent.

8. The CC-NUMA system of claim 7, wherein the response indicates a cache state of the first response agent.

9. The CC-NUMA system of claim 7, wherein the home agent is configured to provide data to the first response agent in response to an indication of failure of achieving the direct cache-to-cache transfer.

10. The CC-NUMA system of claim 1, wherein the home agent is configured to inform the first response agent of a snoop opcode expected to be received by the second response agent.

11. The CC-NUMA system of claim 1, wherein the first response agent is configured to snoop the second response agent in response to a chain of delegated snoop messages including the first delegated snoop message and at least one additional delegated snoop message.

12. A method of communication in a Cache-Coherent Non-Uniform Memory Access (CC-NUMA) system, the CC-NUMA system including a home agent coupled to a coherent communication network, and first and second response agents coupled to the coherent communication network, the method comprising:
    sending, from the home agent to the first response agent, a first delegated snoop message based on a memory request received from the first response agent, the first delegated snoop message instructing the first response agent to snoop the second response agent;

sending, from the first response agent, a second delegated snoop message to the second response agent bypassing the home agent and based on the first delegated snoop message; and performing a direct cache-to-cache transfer between the first and second response agents based on the second delegated snoop message.

13. The method of claim 12, wherein the first response agent is configured to inform the second response agent that even though an address is homed by the home agent, a response from the second response agent is to be sent to the first response agent.

14. The method of claim 13, wherein the first response agent is further configured to inform the second response agent that data from the second response agent is to be sent to the first response agent.

15. The method of claim 12, wherein the second response agent is configured to send a delegated snoop response to the first response agent, the delegated snoop response configured to confirm that the second response agent can send the direct cache-to-cache transfer to the first response agent.

16. The method of claim 15, wherein the delegated snoop response is configured to provide information related to a cache state of the second response agent after servicing the snoop.

17. The method of claim 12, wherein the first response agent is configured to send a response to the home agent, the response indicates a cache state of the second response agent.

18. The method of claim 17, where in the response indicates success or failure of achieving the direct cache-to-cache transfer between the first response agent and the second response agent.

19. The method of claim 12, wherein the home agent is configured to inform the first response agent of a snoop opcode expected to be received by the second response agent.

20. A Cache-Coherent Non-Uniform Memory Access (CC-NUMA) system, comprising:

a home agent coupled to a coherent communication network; and first and second response agents coupled to the coherent communication network, wherein the home agent is configured to send a chain of delegated snoop messages, the chain of delegated snoop messages including a first delegated snoop message that is sent to the first response agent, the first delegated snoop message instructing the first response agent to snoop the second response agent, wherein the first response agent is configured to snoop the second response agent in response to the first delegated snoop message, and wherein the first and second response agents are configured to perform a cache-to-cache transfer during the snoop.

\* \* \* \* \*